United States Patent [19]

Stone et al.

[11] 3,887,757

[45] June 3, 1975

[54] LAMINATES HAVING A POLYURETHANE ADHESIVE

[75] Inventors: Edward Stone, Morris Plains; Joseph Zamer, Paramus; Matthew Guagliardo, Bloomfield; Kenneth F. Wieland, Pompton Plains, all of N.J.

[73] Assignee: Inmont Corporation, New York, N.Y.

[22] Filed: May 29, 1973

[21] Appl. No.: 364,817

[52] U.S. Cl... 428/425; 260/77.5 TB; 260/29.2 TN; 156/331; 428/518; 428/516; 428/520
[51] Int. Cl............................................. B32b 27/40
[58] Field of Search ............ 260/29.2 TN, 77.5 TB; 161/190, 247, 254

[56] References Cited
UNITED STATES PATENTS

| | | | |
|---|---|---|---|
| 2,761,852 | 9/1956 | Lehmann et al. | 260/29.2 TN |
| 2,779,686 | 1/1957 | Kleiner et al. | 260/29.2 TN |
| 2,968,575 | 1/1961 | Mallonee | 161/190 |
| 3,264,134 | 8/1966 | Vill et al. | 260/29.2 TN |
| 3,479,310 | 11/1969 | Dieterich et al. | 260/29.2 TN |
| 3,524,795 | 8/1970 | Peterson | 161/254 |
| 3,552,998 | 1/1971 | Werna et al. | 117/76 F |
| 3,656,998 | 4/1972 | Ottmann et al. | 161/190 |

*Primary Examiner*—George F. Lesmes
*Assistant Examiner*—R. J. Roche

[57] ABSTRACT

Saran films, or saran coated films or substrates are laminated to treated polyethylene films or surfaces, or to other saran surfaces by means of thermoplastic polyether polyurethanes applied to the substrates as aqueous solutions by conventional laminating techniques. Also, treated polyethylene surfaces are laminated together with the thermoplastic polyurethanes.

6 Claims, No Drawings

LAMINATES HAVING A POLYURETHANE ADHESIVE

This invention relates to improved laminates. More particularly the invention relates to improved laminates of saran films or saran coated films to treated polyethylene films or surfaces, or to other saran films or surfaces, and to laminates of treated polyethylene to treated polyethylene. The invention also relates to methods of preparing the said laminates.

The packaging industry employs enormous quantities of film, foil and analogous sheet-like structures for protecting foods from loss of moisture, from the oxidative effect of air or oxygen, from the deleterious effects of light, and for other reasons. Some of the most useful of these packaging films are laminates. Among the most useful laminates are those in which saran, or a saran coated substrate is laminated to a film or sheet of treated polyethylene or laminates wherein treated polyethylene is laminated to another treated polyethylene surface. Saran is a generic name for a copolymer containing between about 25 and 95 weight percent polymerized vinylidene chloride with the remainder being any other monoethyleneically unsaturated monomeric material which is copolymerizable with vinylidene chloride. Treated polyethylene means polyethylene foil, film, etc., which has been treated to provide a surface thereon which has better adhesion for inks, coatings and adhesives. Corona discharge treatment of the polyethylene surface is the method most frequently used; however other methods such as flame treatment and contacting the surface with chromic acid solution are reported in the prior art.

The prior art teaches the use of reactive urethane adhesives for laminating saran to saran, for laminating treated polyethylene to treated polyethylene and for laminating saran to treated polyethylene. Such prior art methods have the disadvantage that the adhesive comprises two components which have to be mixed immediately prior to application. Being reactive, the adhesive has a relatively short "pot life," i.e., the setting of the reactive adhesive becomes so advanced the viscosity build-up is so great that it becomes difficult to apply the adhesive to the substrate. A further disadvantage is that after application of the adhesive, several hours are required for the ultimate bond to be formed by the curing or setting of the adhesive.

In accordance with the present invention the above enumerated disadvantages are overcome by employing a thermoplastic water soluble polyurethane as the adhesive for laminating saran surfaces to treated polyethylene surfaces, or saran surfaces to saran surfaces, or treated polyethylene surfaces to treated polyethylene surfaces. In addition to overcoming the disadvantages mentioned above, the present invention provides a method of laminating wherein less volatile organic solvents have to be evaporated from the adhesive film. This feature of the invention is of increasing importance today because of the increasing awareness of the deleterious effects of various contaminants on our environment.

An important embodiment of the invention is a heat-sealable, essentially moisture-proof and grease-proof laminated film structure comprised of a layer or film of treated polyethylene laminated to a preformed substrate layer or sheet of saran or saran coated substrate such as saran coated cellophane, saran coated polyester, saran coated nylon, or saran coated polypropylene, wherein the laminating adhesive is an essentially thermoplastic polyurethane prepared from polyurethane forming reactants, using conventional catalysts wherein at least one of the reactants contains a tertiary nitrogen atom which imparts sufficient basicity to the polymer to enable it to form water soluble salts with carboxylic acids.

The thermoplastic polyurethane is a polyether polyurethane and is prepared from a polyalkylene glycol, a diisocyanate, and an N-phenyl or N-alkyl-dialkanolamine. Preferably a difunctional chain extender reactant will be included as a reactant, such as a glycol or an alkylene diamines. An alkylene diamine chain extender is preferred.

Although polypropylene glycol having a molecular weight of 400 to 4000 is preferred as the polyalkylene glycol component becaude of economics and better properties, other polyalkylene glycols, especially polyethylene, can be used in preparing polyurethanes that are operable in the invention.

The diisocyanates useful in preparing the thermoplastic polyether urethanes used in the present invention are those conventionally used in preparing polyurethane resins and include, for instance, methylene diphenyl isocyanate, toluene diisocyanate, hexamethylene diisocyanate, isophorone diisocyanate and hydrogenated methylene diphenyl isocyanate. The aliphatic diisocyanates such as hexamethylene diisocyanate, isophorone diisocyanate, and the hydrogenated aromatic diisocyanates, such as hydrogenated methylene diphenyl isocyanate, are preferred where light stability is important.

The N-alkyl dialkanol amine reactants useful in preparing the thermoplastic polyurethane comprise such reactants in which the alkyl group is a lower alkyl group, i.e., an alkyl group containing 1 to 6 carbon atoms and the alkanol groups contain 1 to 4 carbons. The alkyl group may be a straight chain alkyl group, a branched chain alkyl group or a cyclo-aliphatic hydrocarbon group. A preferred N-alkly dialkanol amine is N-methyl diethanol amine which is preferred for economic reasons as well as for overall optimization of properties.

The preferred chain extender, when used, is an aliphatic diamine such as ethylene diamine, propylene diamine, butylene diamine and hexamethylene diamine or an alkanol amine such as ethanol amine. Ethylene diamine is especially preferred.

Polyether polyurethanes useful in the invention are prepared by reacting the desired N-phenyl or N-alkyl dialkanol amine and polyether diol with an excess of the desired diisocyanate, up to an NCO to OH ratio of 10:1 excess of diisocyanate on a molar basis being used. The reaction preferably is carried out in a volatile inert water miscible organic solvent such as water miscible ketones, ethers and esters. Methyl ethyl ketone is especially preferred. The reaction is continued, by heating to the reflux temperature of the solvent if desired, until reaction is complete as indicated by a substantially constant isocyanate (NCO) assay. At this point the polyurethane may be capped, or terminated, by reacting the remaining isocyanate groups with a monofunctional lower alcohol, such as isopropanol, but in most cases the polyurethane polymer which still contains isocyanate groups is preferably chain extended with an alkylene diamine to obtain a preferred molecular size and the resulting chain extended polyurethane which still contains some unreacted isocyanate groups is capped with excess isocyanate reactant such as water miscible alcohol, hydroxycarboxylic acid, or water.

For polyether polyurethanes to be useful in the present invention, it is necessary that they contain 2.0 to 8.0% by weight, preferably 3 to 5% by weight, of nitrogen derived from isocyanate groups. In general the higher precentages of nitrogen produce harder polymers while the lower percentages of nitrogen produce softer polymers. Polymers containing 3 to 5% by weight of isocyanate derived nitrogen and 0.75 to 1.5% by weight of tertiary amine derived nitrogen are preferred because they provide the most desirable combination of adhesive bond strength and water dilutability. Generally the reaction of the prepolymer containing isocyanate groups with the diamine chain extender is carried out at temperature range on the order of 25° to 70°C. The reaction is carried out stepwise to avoid variations in molecular weight from batch to batch. Ordinarily the desired degree of chain extension will be achieved when an isocyanate assay of about 0.005 to 0.20 milliequivalents of NCO per gram of solution at 50% by weight solids is obtained. Isocyanate assay is determined on a small sample of the reaction mixture by reacting the isocyanate with excess dibutyl amine, back titrating the excess amine with acid and then calculating the milliequivalents of NCO after correcting for the amount of tertiary amine groups in the polymer.

The amount of N-phenyl dialkanol amine or N-lower alkyl dialkanol amine used in the polymer can be sufficient to produce a polymer containing on the order of 0.5 to 2.5% by weight, of tertiary nitrogen, or enough to make the polymer soluble in aqueous acidic solutions. Ordinarily salts of the polymer become soluble in water when the polymer contains at least about 0.5% by weight of tertiary nitrogen. The upper limit of tertiary nitrogen content is not critical for water solubility as the salt but for optimum properties for use in the present invention it is preferred that the upper limit of tertiary nitrogen content should not exceed about 2.5% by weight of the polymer.

When the polymer size that is desired has been obtained, preferably by chain extension as described herein above, and a polymer having an isocyanate assay on the order of 0.005 to 0.20, preferably 0.07 to 0.1, milliequivalents of NCO is obtained the polymer is capped, or terminated by reacting the remaining isocyanate groups with an excess of isocyanate reactant, preferably a water miscible alcohol, e.g., isopropanol, ethanol, water, lactic acid, etc. Any large excess of the water miscible alcohol solvent or water that is added as the isocyanate reactant to terminate or cap the polymer may also serve as a solvent for the polymer.

To convert the prereacted, capped, thermoplastic polyether urethane to use as an adhesive for making the saran laminates of the present invention, it is preferred that it be converted to a water soluble salt by reacting with the appropriate amount of an acid. Although acids in general, both organic acids and mineral acids, are effective to solubilize the polymer, the preferred acids to use are the substantially non-toxic organic carboxylic acids, especially acids that have been approved by the Food and Drug Administration for use in foods and food packaging. Lactic acid is such an acid and is very suitable for use in the present invention. Although the upper limit of the amount of acid to use is not particularly critical, it has been found that the lower limit is critical and that at least about 75% of the theoretical amount required to neutralize the polymer must be used to solubilize it. Increasing the amount of acid above the minimum required to solubilize the polymer tends to increase the viscosity of the solution and thus provides a convenient means of regulating the viscosity for application purposes.

The following examples in which the parts are by weight will further illustrate the invention.

EXAMPLE 1

A reaction mixture consisting of:

|  | Parts |
| --- | --- |
| Polypropylene glycol, M.W. of 1007, Hydroxyl No. 108 | 483 |
| N-Methyl diethanolamine | 64.4 |
| Toluene diisocyanate | 195 |
| Dibutyltin dilaurate (catalyst) | 0.35 |
| Methyl ethyl ketone | 743.0 | was heated at reflux until an NCO assay of between 0.13 and 0.16 was obtained. At this point the temperature was reduced to 60°–65°C. and a calculated amount of ethylene diamine was added to lower the NCO assay value of 0.07 milliequivalents per gram. The calculation of the amount of ethylene diamine was made as follows:

Grams ethylene diamine required =

(milliequivalents of NCO per gram − 0.07)

× batch weight in grams × Mol.

Weight of ethylene diamine/2000.

Reaction between the ethylene diamine and isocyanate prepolymer is rapid and is assumed to be complete within a few minutes after which time 1060 parts of isopropanol and 82.5 parts of lactic acid (88% technical grade) was added and the reaction mixture cooled to room temperature. The resulting polyurethane resin solution contains 30% solids by weight and is converted to a laminating adhesive by reducing it 1:1 with water to give a clear solution of approximately 15% solids. At 15% solids the adhesive is suitable for application by gravure cylinder at approximately 0.5 pounds/ream (3,000 square feet). It is applied to saran film or saran coated substrates such as saran coated cellophane, or to treated polyethylene surface, the solvents are evaporated, and the adhesive coated surface is then adhered to the desired surface such as treated polyethylene film or another saran film by conventional laminating technique to give packaging laminate films having ultimate bond strengths immediately at the end of the laminator. Immediate, or initial, bond strengths on the order of 350 to 600 grams are easily obtainable.

Bond strengths as used in the present application are measured on an Amthor Tensile Tester, Type 272 (available from Brooklyn, New York) and is the force, in grams, required to separate the laminate using a one-inch wide strip of laminate and a jaw separation rate of 12 inches per minute. Initial bond strength of at least 350 grams is required for a satisfactory laminate. If lower bond strengths are obtained, it indicates that all solvents were not removed from the adhesive film prior to lamination. In such cases, it is only necessary to adjust the drying ovens to ensure complete removal of solvents. Drying temperatures on the order of 190° to 220°F are preferred.

EXAMPLE 2

A reaction mixture consisting of:

|  | Parts |
| --- | --- |
| Polypropylene glycol (as in Example 1) | 523 |
| N-Methyl diethanolamine | 81.5 |
| Hydrogenated methylene diphenyl isocyanate (e.g., Hylene W) | 356.5 |
| Dibutyltin dilaurate (catalyst) | .48 |
| Methyl ethyl ketone | 961 | was heated at reflux until a constant NCO assay of 0.141 was obtained. A calculated amount of ethylene diamine, sufficient to lower the NCO assay to 0.07 milliequivalents/gram of 50% solution, and then 105 parts of an 88% lactic acid solution in water was added and the reaction mixture was stirred for 15 minutes. Then 1414 parts of isopropanol was added to form a clear solution of resin, 30% solids by weight, having a viscosity of 250–700 centipoises at 25°C. The polymer contains 3.95% by weight of N derived from isocyanate and 1% by weight of tertiary N. The polymer solution was converted to an aqueous adhesive composition in a manner similar to Example 1. The adhesive composition was used in a manner similar to Example 1 to form laminates having bond strengths of more than 350 grams.

EXAMPLE 3

A reaction mixture consisting of:

|  | Parts |
| --- | --- |
| Toluene | 923 |
| Polypropylene glycol (as in Example 1) | 443 |
| Methyl diethanolamine | 69.2 |
| Hydrogenated methylene diphenyl isocyanate | 302 |
| Dibutyltin Dilaurate | 0.163 | was heated at 100°C. and held for about two hours, or until the NCO assay was constant at 0.153 milliequivalents/gram of 50% solution. The temperature was then dropped to 40°C. and 94% of the theoretical amount of ethylenediamine required to react with the remaining NCO group was added by first dissolving 100% of the theoretical diamine in 725 parts of isopropyl alcohol, and then adding 90% of this solution at one time followed by increments of 1% until the viscosity of the solution reached 70 poises. The resulting polymer contained 4.43% N derived from isocyanate and 0.98% tertiary N. To the polymer solution was added 70 parts of glacial acetic acid (i.e., twice the equivalent of tertiary amine) and 500 parts of water. The mixture was azentropically distilled to remove the toluene with 1731 parts of water being added to replace the distillate. After cooling to room temperatures the viscosity of the resin solution was adjusted to 186 poises at 28.6% solids, by adding 118 parts of water. The resulting solution was stable and, when reduced with an equal amount of water, it gave an adhesive composition which produced laminates that were equally as good as those produced by the adhesive of Example 1.

EXAMPLE 4

A reaction mixture consisting of:

|  | Parts |
| --- | --- |
| Polypropylene glycol (as in Example 1) | 44.2 |
| Methyl diethanolamine | 6.92 |
| Ethanolamine | 0.92 |
| Hydrogenated methylene diphenyl isocyanate | 31.75 |
| Dibutyltin dilaurate | .16 | was cast on a Teflon plate and heated for 30 minutes at 100°C. to obtain a clear, soft and flexible solid which was slightly tacky to the touch. The polymer contains 4.05% isocyanate derived N and 0.985% tertiary N. It was dissolved at 30% total non-volatiles in aqueous acetic acid containing only an excess of 10% acetic acid over that required to neutralize the tertiary amine groups. The solution was stable and could be used as in Example 1 to form a laminating adhesive which gives good laminates with saran to saran surfaces, and saran to treated polyethylene surfaces, and treated polyethylene surfaces to treated polyethylene surfaces.

EXAMPLE 5

A reaction mixture consisting of:

|  | Parts |
| --- | --- |
| Polypropylene glycol (as in Example 1) | 443 |
| N-Methyl diethanolamine | 69.2 |
| Hydrogenated methylene diphenyl isocyanate | 302 |
| Dibutyltin dilaurate | 0.41 |
| Methyl ethyl ketone | 815.0 | was heated at reflux until a constant NCO assay of 0.1165 milliequivalents of NCO per gram of 50% solution was obtained. Sufficient ethylene diamine was added to reduce the NCO assay to about 0.10 milliequivalents NCO/gram of a 50% solution. Thereafter small quantities of ethylene diamine was added to further reduce the NCO assay to 0.07 and then, after stirring for 15 minutes, 81.5 parts of lactic acid (88% solution in water) was added and enough water to reduce the solids content to 30%. The solution was azeotropically distilled, by adding water to replace the distillate of methyl ethyl ketone, unitl 926 parts of distillate was collected. The resulting resin solution, of clear light amber color, had a viscosity of 250 to 700 centipoises at 25°C., a tertiary N content of 1.0% and a 3.95% N derived from isocyanate. The adhesive composition formed by diluting the resin solution to 15% solid with water gave laminates similar to those of Example 1.

While there have been described what is at present considered to be the preferred embodiments of this invention, it will be obvious to those skilled in the art that various changes and and modifications may be made therein without departing from the invention; and it is, therefore, aimed to cover all such changes and modifications as fall within the true spirit and scope of the invention.

What is claimed is:

1. A laminate of the group consisting of saran adhesively bonded to saran, saran adhered to treated polyethylene and treated polyethylene adhered to treated polyethylene wherein the adhesive is a water soluble salt of a substantially linear thermoplastic polyurethane containing 0.5 to 2.5% by weight of nitrogen derived from tertiary amine groups and from 2 to 8% of nitrogen derived from isocyanate groups, said polyurethane being prepared by (a) reacting an excess of an isocyanate with a mixture of diols consisting of polyether diols having a molecular weight of from 425 to 4,000 and tertiary amine diols selected from the group consisting of N-phenyl dialkanol amine and N-lower alkyl dialkanol amines to obtain a reaction product having free isocyanate groups greater than 0.1 milliequivalents of NCO per gram of solution at 50% solids, (b) chain extending the reaction product with a chain extender selected from the group consisting of alkanol amines and alkylene diamines to obtain a chain extended polyurethane polymer containing from 0.07 to 0.1 milliequivalents of NCO per gram of solution at 50% solids, (c) reacting the free isocyanate groups with a material selected from the group consisting of water miscible alcohols, acids and water, and adding an amount of a water miscible acid being added sufficient to form the acid salts with the tertiary amine groups present on the polyurethane.

2. A laminate as in claim 1 wherein the polyether diol is polypropylene glycol, the N-lower alkyl dialkanol amine is N-methyl diethanol amine and the acid is a non-toxic organic carboxylic acid.

3. A laminate as in claim 1 wherein the polyurethane is reacted with an excess of a water soluble alcohol and the acid is a non-toxic organic carboxylic acid.

4. A laminite as in claim 3 wherein the isocyanate reactant is isopropyl alcohol.

5. A laminate as in claim 1 wherein the percentage of isocyanate derived nitrogen is 3 to 5% by weight of the tertiary nitrogen is 0.75 to 1.5% by weight.

6. A laminate as in claim 5 wherein the polyether diol is polypropylene glycol, the N-lower alkyl dialkanol amine is N-methyl diethanol amine, the chain extender is ethylene diamine, and the capping agent is isopropanol.

* * * * *